J. E. THOMSON.
Improvement in Spring-Scales.
No. 128,677.
Patented July 2, 1872.
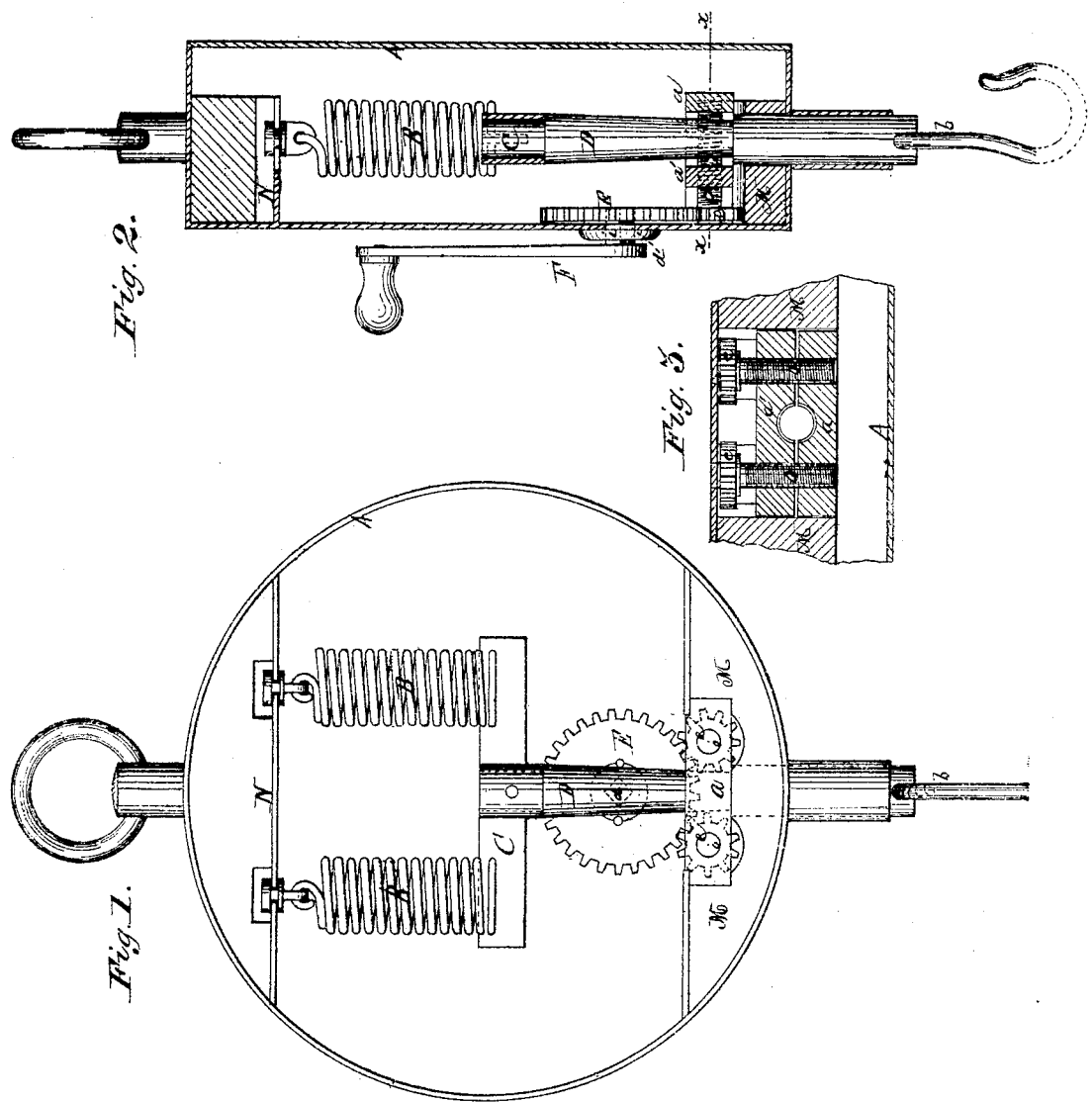

128,677

UNITED STATES PATENT OFFICE.

JAMES E. THOMSON, OF BUFFALO, NEW YORK.

IMPROVEMENT IN SPRING-SCALES.

Specification forming part of Letters Patent No. 128,677, dated July 2, 1872.

*To all whom it may concern:*

Be it known that I, JAMES E. THOMSON, of the city of Buffalo and State of New York, have invented certain Improvements in Spring-Balances, of which the following is a full, clear, and exact description, reference being had to the accompanying drawing making part of this specification, in which—

Figure 1 is a plan view, showing my invention. Fig. 2 is a vertical cross-section of the same. Fig. 3 is a section on line $x\ x$ of Fig. 2.

My invention has for its object to provide a spring-balance, in which the spring can be relieved of the entire weight of the object to be weighed until the moment the weight is to be noted, so that there shall be no strain of the spring by a prolonged straightening of the springs.

My invention consists in the use of a tapered shaft, to which the article to be weighed is attached, said shaft passing between two friction-clamps, which are operated by suitable gearing, said gearing being turned by a crank suitably located.

In order that those skilled in the art may make and use my invention, I shall proceed to describe the manner in which I have carried it out.

A spring-balance of any desired size is made having the case A and springs B B. The rod which passes from the spring through the bottom of the case is made tapering, as shown by D, the largest diameter of the rod being at its upper end. This rod passes through a bed, M, which rests on the lower side of the circumference of the case. On this bed in any desired manner rest two friction-clamps, $a\ a'$, through which work two screws, $o\ o$, one right and the other left handed. At the ends of the screws $o\ o$, next to the back of the case A, are two pinions, $e\ e$, which engage in a toothed wheel, E. This toothed wheel E has a bearing, $i$, in the back of the case A, and a crank, F, on the outside of the case, by which the wheel E is turned.

The operation of my invention is as follows: The friction-clamps $a'\ a$ being drawn tightly together they clasp the tapering rod D so tightly that any weight placed on the hook $b$ cannot affect the springs B B, but the point of suspension is the contact of the rod with the clamps. Now, to weigh the package hooked on it is only necessary to turn the crank F, and, by means of the wheel E and pinions $e$, loosen the screws and likewise the clamps. Then the weight is thrown on the springs. The rod D being tapered, as shown, allows the weight of the package to be weighed to be thrown gradually upon the spring, thus preventing any sudden strain. If the rod D were a true cylinder, when the clamps were loosened the weight would come upon the spring suddenly and all at once, which would soon destroy it or greatly weaken it.

Having thus described my invention, what I claim as new, and desire to secure by Letters Patent, is—

1. The tapering rod D, in combination with an adjustable clamp for the purpose of allowing the weight to come upon the springs gradually, as described.

2. The clamps $a$ and $a'$ with their screws $o\ o$ and pinions $e\ e$, and the cog E with its crank, in combination with the tapering rod D and springs B, substantially as and for the purpose set forth.

JAS. E. THOMSON.

Witnesses:
WILLIAM FOX,
GEO. R. KIBBE.